June 17, 1924.  J. H. WIESTNER  1,497,820
HORSESHOE
Filed July 12, 1922
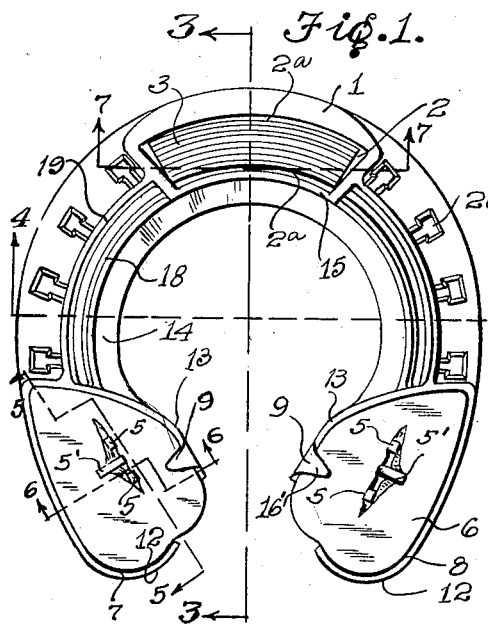
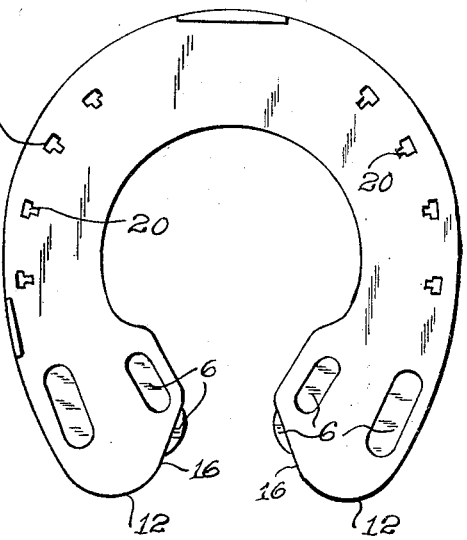
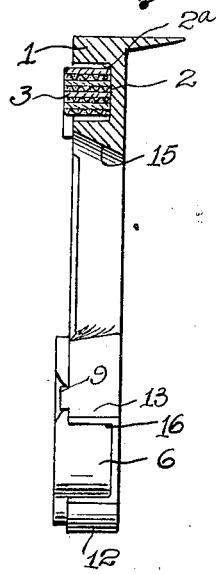
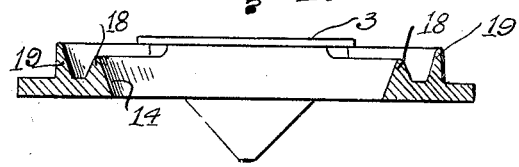
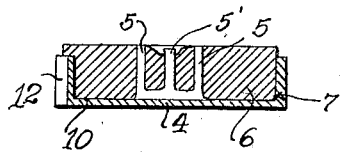
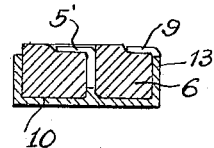
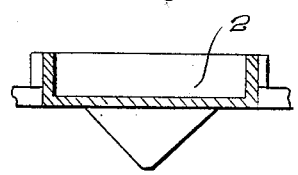
Inventor
John H. Wiestner
By Edson Bros.
Attorney Patented June 17, 1924.

1,497,820

UNITED STATES PATENT OFFICE.

JOHN H. WIESTNER, OF PHILADELPHIA, PENNSYLVANIA.

HORSESHOE.

Application filed July 12, 1922. Serial No. 574,351.

*To all whom it may concern:*

Be it known that I, JOHN H. WIESTNER, a citizen of the United States, residing at Philadelphia, in the county of Philadelphia and State of Pennsylvania, have invented certain new and useful Improvements in Horseshoes, of which the following is a specification.

This invention is a horseshoe of the type which is provided with a non-metallic tread, and having for its object to provide a shoe which will prevent the animal to which it has been applied from slipping on wet or icy pavements or surfaces. A further object of the invention is to provide a shoe which will prevent snow from packing into the hoof, the shoe being so formed that it will cause snow to be expelled from the hoof instead of becoming packed therein and built up to such an extent as to affect the travel of the animal.

The invention aims further to provide a shoe which will facilitate the driving of the nails into the animal's hoof, permitting the retaining nails to be driven into thin or thick walls of the hoof with equal facility, irrespective of the angle or the slant of the hoof.

The invention also has for its object to increase the non-slipping features by providing the shoe with double, practically parallel ribs, which preferably connect the toe and the heel sockets of the shoe.

It also further consists in making the nail-holes in the shoe substantially T-shaped in cross-section, to accommodate similarly shaped nails.

Other advantages of the invention will become apparent from the following detailed description of the invention taken in connection with the accompanying drawings and the appended claims.

While a preferred embodiment of the invention is set forth in the accompanying drawings, it is to be understood that the construction therein shown is for the purpose of illustration only, and not for defining the elements of the invention, the scope of the invention being set forth in the appended claims.

In the drawings:

Figure 1 is a plan view of the completed shoe showing the non-slip tread,

Fig. 2 is a top plan view of the device,

Fig. 3 is a sectional elevation on the line 3—3 of Fig. 1,

Fig. 4 is a sectional elevation on the line 4—4 of Fig. 1,

Fig. 5 is a view taken on the line 5—5 of Fig. 1,

Fig. 6 is a view taken on the line 6—6 of Fig. 1, and

Fig. 7 is a vertical section of the toe socket taken substantially on the line 7—7 of Fig. 1.

Referring more particularly to the embodiment of the invention set forth in the accompanying drawings, the shoe proper may be of any suitable material, such as steel. It is shown provided with a thickened toe portion indicated at 1, and having a chamber formed thereon, as at 2. This chamber is elongated and shown arcuate in form, and is designed to receive suitable non-metallic substances, such, for example, as a fibrous tread which may be in the form of rubber or laminated fabric, with the edge of the fabric presented to the tread of the shoe. This fabric is indicated at 3 in the drawing. The non-slipping material to be placed in this socket is preferably made narrower than the socket in which it is placed, thereby forming space to add to the the non-slipping of the toe-calk by gathering foreign matter on the road to fill said space 2ª. This material is formed so that the end portions will frictionally engage the ends of the sockets for primarily retaining the material in the socket. The spaces 2ª will be packed by the accumulation of road material which will pack the fabric 3 therein, and also give additional gripping surface. The bottom walls 4 of the heel sockets may be provided with spurs indicated at 5, which may be employed to retain the rubber 6 in each of the heel sockets 7 and 8. The spurs are bent into engagement with the rubber, which bending operation may be effected after the shoe has been fitted to the animal. The series of three spurs projecting centrally through the non-slipping rubber material 6 are of such length that the central spur 5' is longer than the outer spurs, which permits said longer spur to be bent upon the non-slipping material, as shown in Fig. 1 of the drawings. There are also clinchers 9 which are formed integral with the sockets and are adapted to be bent down upon the non-slipping material, as shown also in Fig. 1.

The shoe is provided also with broad heel members indicated at 7 and 8 in the drawing. These heel members may be substantially alike in form, if desired. They are shown provided with a chamber indicated at 10, having an upstanding lug 5' formed substantially centrally of the chamber and integral with the shoe. The heel member is shown rounded as at 12, at the outer end of the shoe and provided with an annular wall 13 at an inner surface of the shoe, which is directed toward the frog of the animal's foot. This annular wall 13 cooperates with a beveled portion 14 of the shoe, and an inclined section 15 of the toe member 1 to cause snow to be drawn over the shoe at each step the animal takes, instead of being packed or bound into the shoe to build up against the animal's foot, and so form a cake of icy material therein as to render it injurious to the animal when traveling. The walls of the heel sockets are cut away, or left blank, at the outer ends, as indicated at 16, in order to provide for the projection of the non-slipping material, which may be cut down to accommodate said non-slipping material to the position of the frog of the foot.

The heel portions 7 and 8 are preferably provided with non-metallic tread surfaces, which may be in the form of rubber 6 or laminated woven material 3, as described for the toe section, such material being shown extending around the retaining central lug 5'. If desired, the material may be secured by any suitable means, such as a spur, indicated at 9, preferably cut to a tapered form, as indicated at 16'. If desired, the heel sections 7 and 8 may be provided with elongated spurs 5, 5', the longest of which may be bent downwardly into contact with the material 6 positioned in the recessed heel portions.

It is to be understood that the non-slipping material can be easily and quickly removed and replaced by other material should the substance become worn beyond the degree wherein it can be applied to the shoe after the shoe shall have been fitted and nailed to the animal's foot, and thereafter the spurs 5, 5', and 9 can be driven down into engagement with the non-metallic substance.

The parallel ribs 18 and 19, extend from the toe socket to the heel sockets on each side of the shoe, the inner rib 18 being of less depth than the outer rib 19, to provide space within which will be gathered foreign matter which also will constitute a non-slipping surface.

The apertures indicated at 20, being T-shaped, are preferably placed crosswise of the tread of the shoe instead of longitudinally thereof, as is usually the case, thereby making the nails less difficult to drive into the hoof, as it has been found that the hoofs of all animals do not have the same slant or inclination. With the nail holes placed crosswise the shoe, the nails can be driven into the thin or thick walls of the hoof with equal facility, and it has been found that the shoe can be adjusted to any slant or angle of the hoof. The nail-holes 20 are sufficiently tapered in cross-section to receive the nails and make snug fits and prevent the nails from coming into contact with the road surface or pavement, and thereby to prevent the nails from becoming worn or broken.

Having thus described the invention, what I claim is:

1. A horseshoe having a recessed toe portion and recessed heel terminals, a non-metallic tread element in said recessed toe portion adapted to be primarily retained therein by frictional engagement and adapted to be packed therein by accumulation of road material, non-metallic tread elements in said recessed heel terminals, said recessed heel terminals being formed with upstanding retaining members adapted to be bent into retaining engagement with said last-named non-metallic tread elements.

2. A horseshoe comprising a casting having a recessed toe portion, a non-metallic tread therein adapted to be primarily retained therein by frictional engagement and adapted to be packed therein by accumulation of road material, said casting having recessed heel terminals provided with upstanding retaining members therein, non-metallic tread elements in said recessed heel terminals, said upstanding retaining members being bent over into retaining engagement with the non-metallic tread elements in said heel terminals, each of said recessed heel terminals having a cut-away portion, and said non-metallic tread elements in said heel terminals projecting through said cut-away portions in a line with the frog of the animal's hoof.

3. A horseshoe having a recessed portion, and a non-metallic tread element in said recessed portion, said tread element being narrower than the recess but of a length to be primarily retained therein by frictional engagement, the space between the sides of the tread element and the walls of the recess being adapted to be packed with road material, whereby the tread member will be packed in the recess by the accumulation of road material, and the road material will give additional gripping surface.

In testimony whereof I affix my signature.

JOHN H. WIESTNER.